Nov. 7, 1939.  E. C. HORTON  2,179,451
WINDSHIELD WIPER
Filed Dec. 24, 1934
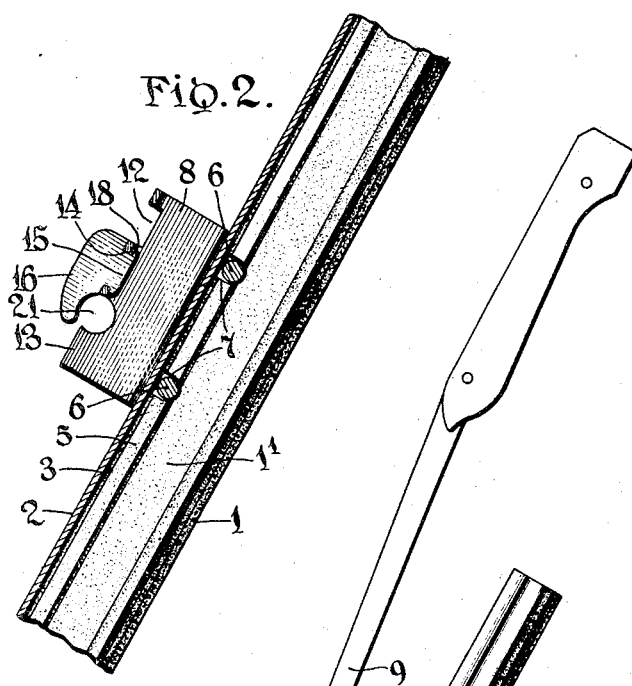
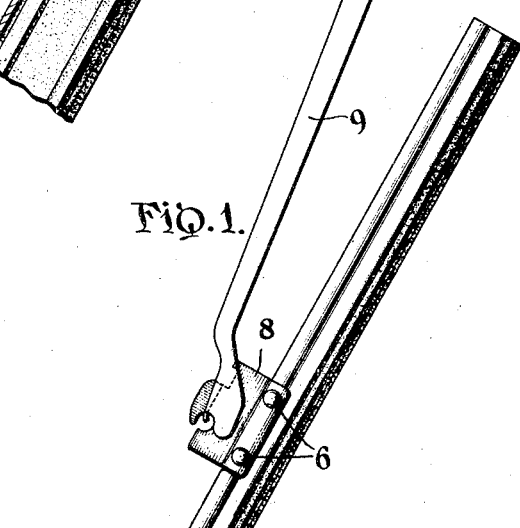
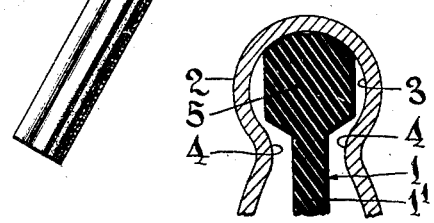
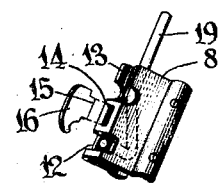
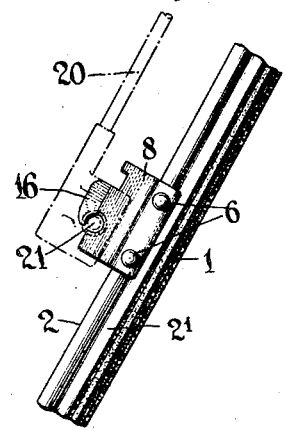
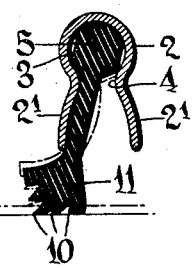
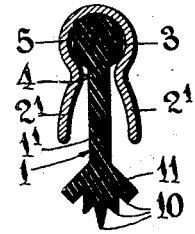
INVENTOR
Erwin C. Horton,
BY
Beau & Brooks
ATTORNEYS Patented Nov. 7, 1939

2,179,451

UNITED STATES PATENT OFFICE 2,179,451

WINDSHIELD WIPER

Erwin C. Horton, Hamburg, N. Y., assignor to Trico Products Corporation, Buffalo, N. Y.

Application December 24, 1934, Serial No. 759,074

5 Claims. (Cl. 15—250)

This invention relates to a windshield cleaner and primarily to the wiper or blade which has cleaning contact with the windshield glass.

The wiper, or wiper blade as it is sometimes referred to, usually comprises a rubber wiping body with a metallic holder or backing, the holder being channeled in formation with its sides firmly clamped over one longitudinal margin of the interposed wiper strip so as to secure these parts together. In clamping the sides of the channeled holder on the rubber wiping strip it sometimes develops that the wiping edge is distorted and therefore an imperfect wiping contact with the glass is obtained. Furthermore, if there is an obstruction on the glass or should the glass be not perfectly flat the rubber wiping edge will only contact with the glass as permitted by the non-yielding rigid holder or backing element and thus as the wiper moves over the glass a streaky effect is obtained which tends to blur and obscure the vision through the windshield.

The present invention has for its object to provide a wiper which will be more efficient in its wiping action and which will clean the glass surface more uniformly. More particularly the invention contemplates the mounting of the wiping element or strip within its holder for relative bodily movement or in a more or less floating or free manner, thereby enabling the wiping edge to more readily flex and yield in conformity with the surface being wiped.

Further, the invention has for its object to improve the connector means between the wiper and its carrying arm.

In the drawing:

Fig. 1 is an elevation of the improved wiper attached to its carrying arm;

Fig. 2 is a fragmentary longitudinal section therethrough;

Fig. 3 is a transverse sectional view through the wiper;

Fig. 4 is a similar view more clearly depicting the action of the wiping strip in its holder;

Fig. 5 is a detailed view of the attaching clip and a modified carrying arm;

Fig. 6 is a side elevation of the clip depicting the same attached to another style of arm; and Fig. 7 is an enlarged cross sectional view illustrating primarily the floating action of the wiping strip.

Referring more particularly to the drawing, the numeral 1 designates the wiping strip, which is preferably formed of rubber composition, and 2 the metal holder or backing element of the wiper or blade. The strip may be molded or extruded, the term "formed" being used in its generic sense herein. The holder is of channeled formation with the bottom of the channel being preferably rounded or curved so as to form an internal bearing surface 3. Outwardly of this bearing surface the sides of the holder are crimped or bent inwardly so as to contract the channel and form internal shoulders 4 which preferably form continuations of the round bearing surface 3.

Loosely disposed within this tubular bearing thus formed by the round bottom 3 and the internal shoulders 4, is the marginal bead or enlargement 5 of the wiping strip. The enlargement 5 is preferably of smaller dimension than the tubular bearing of the holder so as not only to provide for pivotal action of the bead of the tubular bearing but also to provide for a certain amount of play. This play or freedom will permit bodily movement of the wiping strip in and out of the channeled holder to a restricted extent as limited by the shoulders 4 which overlie the bead 5 and thus prevent displacement of the wiper strip from its holder. The bead therefore serves in the capacity of a pintle or hinge as it pivots in the holder bearing.

Longitudinal displacing movement of the wiping strip is prevented by suitable means which according to the present disclosure is in the form of a transversely extending stop 6 with which the wiping strip interlocks, as by freely engaging in the opening 7 of the wiping strip bead. The opening 7 may be conveniently formed by notching the bead 5, as illustrated in Fig. 2. The openings 7 are of such size as to receive the fastener 6 and thereby effect the desired but preferably loose interlock. This freedom in the mounting of the wiping strip permits the bodily movement of the same in its holder and thus when the blade is reciprocated on the glass the wiping strip will bodily pivot in the holder independently of the latter. The sides 2' of the holder, outwardly of the confining shoulders 4, are normally placed laterally from the intermediate web portions 1' of the wiping strip, and serve as limit stops for defining the extent of bodily pivotal movement of the wiping strip in its holder.

This mounting of the wiping strip gives to the same ample freedom of movement with respect to the windshield wiper arm so as to permit the wiping edge to drag on the glass at the proper angle for efficient wiping. The pivoting action of the strip is a bodily one and occurs substantially about the longitudinal axis of the beaded enlargement 5 (as indicated in the dotted showing of Fig. 4).

Should the glazed surface be uneven or should obstruction be encountered by the wiping edge of the blade, such as when moisture has congealed on the glass, such uneven surface will be passed over by the wiping edge without substantially lessening the wiping contact of the remaining portion of the wiping edge. For instance, in Fig. 4 the normal wiping portion is illustrated in the solid line showing, but when an obstruction is encountered by the wiping edge, the latter will be resisted as it yields thereover and will tend to flex the intermediate web portion of the wiping strip, as depicted in the dotted line showing. This flexing or bending action will take place over the adjacent edge of the holder and results in an outward pulling on the body of the strip tending to withdraw the beaded enlargement 5 from firm bearing contact with the bearing surface 3 in the region of such outward urge.

The wiping edge of the strip 1 may have a series of small sharp ribs, such as is indicated at 10, and for this reason the wiping edge may be enlarged in the form of a head 11. The wiper strip, therefore, is enlarged along both of its longitudinal edges to provide for the pivoting anchor bead 5 as well as the wiping head 11, the two marginal enlargements being connected by the intervening and comparatively reduced web 1'. The wiping head 11 is preferably disposed a slight distance beyond the edges of the holder 2' so as not to contact therewith under normal pressure, but when overriding an obstruction or when otherwise subjected to abnormal pressure the web may bend over the edge of the holder and in so doing pull outwardly on the anchoring bead, as depicted in Fig. 4. This enables the wiping head to conform more readily to the surface being cleaned.

The blade attaching clip 8 is U-shaped in cross section and is disposed so that its opposite sides straddle the back of the holder, being secured thereto by fasteners which may also constitute the stops 6. The back wall of the clip is provided with an opening 12 and a slot 13 to adapt the wiper for attachment to the hooked type of carrying arm 19 (Fig. 5). The back wall portion intermediate the openings 12 and 13 is slotted, as at 14, to receive a securing stud 15 of a fin 16, the stud being swaged over, as at 18, to firmly attach the same. This adapts the wiper for attachment to the slotted type carrying arm 9 (Fig. 1). The fin 16 overhangs the clip 8 and advantage is taken of in this arrangement to adapt the blade for attachment to that type of arm 20 (Fig. 2) which has spaced flanges to receive the wiper, being fastened thereto by a removable bolt that passes beneath the overhanging part of the clip 8. To this end, the overhanging fin 16 and the immediately underlying body portion of the clip are cored out to form a bolt receiving opening 21. This clip, therefore, is universal in character in that it adapts the wiper blade for attachment to the several types of wiper arms now generally in use.

What is claimed is:

1. A windshield wiper comprising a channeled holder provided adjacent to the bottom of the channel with inwardly extending and opposed shoulders, said shoulders defining with the bottom of the channel a confining bearing extending substantially throughout the length of the holder, and a formed rubber strip provided with a marginal enlargement along one edge loosely received within the bearing for journal support therein, said marginal enlargement being smaller in cross section than such bearing for free bodily movement therein, the opposite longitudinal edge of the strip being formed for wiping contact with the windshield glass, the sides of the channeled holder extending outwardly beyond said shoulders and in spaced relation to the interposed wiper strip to permit movement of the latter about the longitudinal axis of said marginal enlargement.

2. A wiper blade for windshield cleaners comprising a channeled holder formed to provide above its bottom a confining bearing throughout the length of the holder, a yieldable wiping strip having a marginal enlargement along one edge disposed in the bearing for bodily pivotal movement, the sides of the holder beyond the confining bearing being spaced from the sides of the strip and the opposite marginal edge of the strip projecting beyond the sides of the holder to form a wiping edge, and means interlocking with the marginal enlargement for securing the strip against longitudinal displacement from its holder, such interlocking engagement permitting of such bodily pivotal movements of the strip in its holder.

3. A windshield wiper comprising a channeled holder member having the opposing sides of the channel contracted to form a bearing throughout the length of the holder, and a wiping element received by the holder and provided along one edge with an enlarged bead loosely fitting in the channel of the holder and having journaled support in the bearing portion of the channel whereby said wiper member may bodily pivot in the holder, the sides of the holder outwardly from said contracted portion being spread apart to permit such bodily pivotal movement of the wiper member, and said wiper extending outwardly beyond the sides of the holder and formed with a surface wiping edge.

4. A wiper comprising a holder, and a wiping strip, the holder being of channeled formation, and the wiping strip having a marginal portion pivotally received in the channel of the holder, an attaching clip, and means for attaching the clip to the holder, the marginal portion of said wiping strip having a notch interlockingly receiving said means to hold said strip against longitudinal displacing movement from the holder.

5. A windshield wiper comprising a channeled holder member having the opposed sides of the channel formed to provide a bearing throughout the length of the holder, and a wiping element received by the holder and provided along one edge with an enlarged bead pivotally received in the bearing.

ERWIN C. HORTON.